US010133720B2

(12) United States Patent
Rothschiller et al.

(10) Patent No.: US 10,133,720 B2
(45) Date of Patent: Nov. 20, 2018

(54) SHOWING PRESENCE OF MULTIPLE AUTHORS IN A SPREADSHEET

(71) Applicant: MICROSOFT TECHNOLOGY LICENSING, LLC, Redmond, WA (US)

(72) Inventors: Chad Rothschiller, Edmonds, WA (US); Tarek Hefny, Redmond, WA (US); Paul Louis Berruti, Jr., Seattle, WA (US); Micah Myerscough, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 678 days.

(21) Appl. No.: 13/918,913

(22) Filed: Jun. 15, 2013

(65) Prior Publication Data

US 2014/0372852 A1     Dec. 18, 2014

(51) Int. Cl.
G06F 17/21     (2006.01)
G06F 17/24     (2006.01)
G06F 17/22     (2006.01)

(52) U.S. Cl.
CPC .......... G06F 17/246 (2013.01); G06F 17/212 (2013.01); G06F 17/2288 (2013.01)

(58) Field of Classification Search
CPC .................................................. G06F 17/246
USPC ....................................................... 715/212
See application file for complete search history.

(56) References Cited

U.S. PATENT DOCUMENTS

| 6,006,239 | A | * | 12/1999 | Bhansali | G06F 17/246 |
| 6,988,241 | B1 | * | 1/2006 | Guttman | G06F 17/246 |
| | | | | | 707/E17.115 |
| 8,307,119 | B2 | * | 11/2012 | Rochelle | G06F 17/246 |
| | | | | | 709/201 |
| 8,543,926 | B2 | * | 9/2013 | Giles | G06Q 10/10 |
| | | | | | 345/419 |
| 2003/0014513 | A1 | | 1/2003 | Ruths et al. | |
| 2003/0188259 | A1 | * | 10/2003 | Aureglia | G06F 17/246 |
| | | | | | 715/214 |
| 2007/0186157 | A1 | | 8/2007 | Walker et al. | |
| 2007/0219956 | A1 | | 9/2007 | Milton | |
| 2007/0233811 | A1 | * | 10/2007 | Rochelle et al. | ............. 709/219 |
| 2009/0089067 | A1 | | 4/2009 | Campbell et al. | |

(Continued)

FOREIGN PATENT DOCUMENTS

CN     102934105 A     2/2013

OTHER PUBLICATIONS

Bickmore et al. "Animated Autonomous Personal Representatives", 1998, ACM, pp. 8-15.*

(Continued)

Primary Examiner — James J Debrow

(57) ABSTRACT

Dynamic collaborative presence information is provided. A plurality of users may access a document concurrently. Presence information associated with each of the users may be communicated to a server, collected, and communicated to a client application running on each user's client device. The client application may dynamically show where other users are editing a cell or a range of cells to help avoid collisions of edits in the document. Various interface elements may be provided for indicating presence and for indicating whether a single user or multiple users have selected or are editing the cell or range of cells.

20 Claims, 15 Drawing Sheets

(56) References Cited

U.S. PATENT DOCUMENTS

| | | | |
|---|---|---|---|
| 2009/0112937 A1 | 4/2009 | Campbell et al. | |
| 2011/0252299 A1 | 10/2011 | Lloyd et al. | |
| 2012/0054591 A1* | 3/2012 | Ueberschaer et al. | 715/220 |
| 2013/0007118 A1 | 1/2013 | Rochelle et al. | |
| 2013/0155071 A1* | 6/2013 | Chan | G06T 13/00 345/473 |
| 2013/0229429 A1* | 9/2013 | Mi et al. | 345/593 |
| 2014/0245120 A1* | 8/2014 | Schwartz et al. | 715/226 |

OTHER PUBLICATIONS

"International Preliminary Report on Patentability Issued in PCT Application No. PCT/US2014/041268", dated Oct. 19, 2015, 11 Pages.

"International Search Report and Written Opinion Issued in PCT Application No. PCT/US2014/041268", dated Dec. 4, 2014, 15 Pages.

"Second Written Opinion Received for PCT Patent Application No. PCT/US2014/041268", dated Jun. 23, 2015, 9 Pages.

"Use a Shared Workbook to Collaborate", Retrieved on: Apr. 23, 2013, Available at: http://office.microsoft.com/en-001/excel-help/use-a-shared-workbook-to-collaborate-HP010096833.aspx, 6, pgs.

"About Spreadsheet Views", Published on: Mar. 14, 2013, Available at: http://support.google.com/drive/bin/answer.py?hl=en&answer=139561, 2, pgs.

"Google Docs: Spreadsheet basics", Retrieved on: Apr. 26, 2013, Available at: https://docs.google.com/document/d/1SBno3gqXx2v0R_RMI5dj23ArlkRqtD-W8YR3LLOEK9M/edit?hl=ja&a&pli=1, 9 pgs.

"First Office Action and Search Report Issued in Chinese Patent Application No. 201480045068.X", dated Jul. 5, 2017, 21 Pages.

"Second Office Action Issued in Chinese Patent Application No. 201480045068.X", dated May 28, 2018, 12 Pages.

* cited by examiner

FIG. 5

| | A | B | C | D |
|---|---|---|---|---|
| 76 | Ann Barker | Ann.Barker@email.com | (555) 555-1234 | |
| 77 | Bob Clark | Bob.Clark@email.com | (555) 555-5678 | |
| 78 | Calvin Davis | Calvin.Davis@email.com | (555) 555-9876 | |
| 79 | Don Evans | Don.Evans@email.com | (555) 555-1212 | West Tunnel |
| 80 | Eliza Farmer | Eliza.Farmer@email.com | (555) 555-3434 | |
| 81 | | | | |
| 82 | | | | |
| 83 | Fred Goins | | | |

FIG. 7

| | | |
|---|---|---|
| 76 | Ann Barker | (555) 555-1234 |
| 77 | Bob Clark | (555) 555-56... |
| 78 | Calvin Davis | (555) 555-9876 |
| 79 | | West Tunnel |
| 80 | Don Evans | (555) 555-1212 |
| 81 | Eliza Farmer | (555) 555-3434 |
| 82 | Fred Goins | |
| 83 | | |
| 84 | | |

SPREADSHEET APPLICATION

Ann.Barker@email.com
Bob.Clark@email.com
Calvin.Davis@email.com
Don.Evans@email.com
Eliza.Farmer@email.com

FIG. 8

MOBILE COMPUTING DEVICE

SHOWING PRESENCE OF MULTIPLE AUTHORS IN A SPREADSHEET

BACKGROUND

Oftentimes when using a computer software application, a collaborative process may be used in the development of electronic documents. Typically in such as process, a plurality of users may access a document, view the content, and may edit, delete, or add content to the document. It is a growing trend for users to use online companions to client software applications to view and edit documents stored on a server via a thin client, such as a web browser.

When multiple users are collaborating on a document, a user may be unaware of where others in the document are working. Not knowing where another user is working in a document may lead to confusion, conflict, and may increase the chases of a user becoming frustrated as he works collaboratively on a document.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing dynamic collaborative presence information. According to embodiments, presence information associated with users concurrently editing a document may be collected and provided to each client application. Presence information may include, but is not limited to, information associated with where users are working in a document (e.g., a cell, a range of cells, etc.), information associated with who the other users are (e.g., name, picture, status, title, etc.), and information associated with what the users are doing (e.g., editing, selecting, active, inactive, etc.). The client application may dynamically show where other users are editing a cell or a range of cells to help avoid collisions of edits in the document. A user interface element may be provided with a presence indicator, indicating whether a single user or multiple users have selected or are editing the cell or range of cells. Embodiments may provide a real-time sense of where other users are working, improving the collaborative work process.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention. In the drawings:

FIG. 5 is an illustration of the example document of FIG. 2 including a display of a multi-user UI element after a trigger is received;

FIG. 7 is an illustration of the example document of FIG. 2 including a multi-cell range selection;

FIG. 8 is an illustration of the example document of FIG. 2 including overlapping multi-cell range selections;

DETAILED DESCRIPTION

Figure 1:
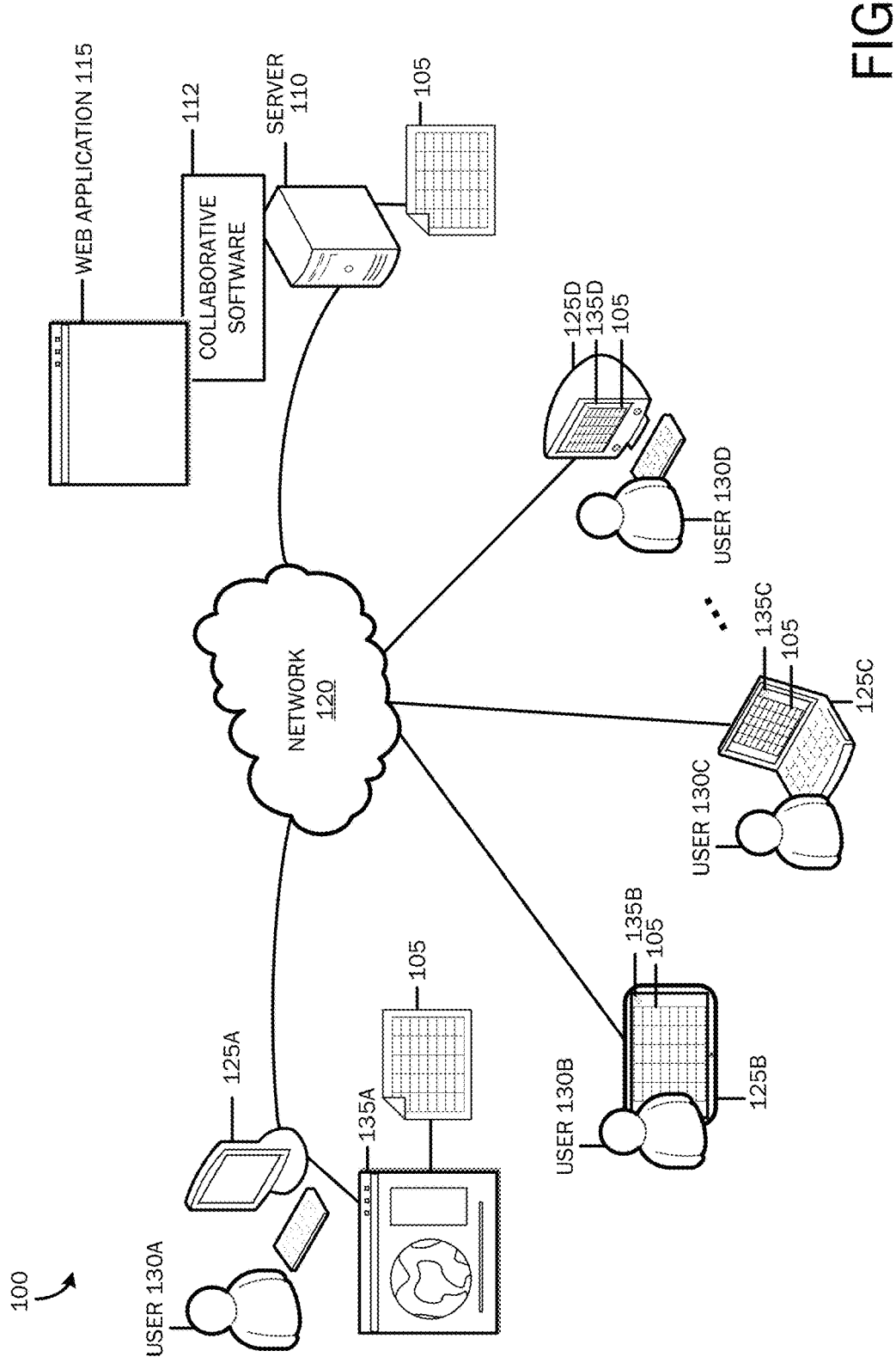
FIG. 1 is a simplified block diagram of a system for providing dynamic collaborative presence information.

As briefly described above, embodiments of the present invention are directed to providing presence information of multiple users in a document. The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to the drawings, in which like numerals represent like elements, various embodiments will be described. FIG. 1 is a simplified block diagram illustrating a system architecture for providing dynamic collaborative presence information. The system 100 includes one or more client devices 125A-D (referred to collectively or individually as client devices 125), communicatively connected to a server device 110 (or a plurality of server devices) by way of a network 120, such as an intranet, extranet, or the Internet. The one or more client devices 125 may include a thin client application 135A-D (referred to collectively or individually as a client application 135), for example, a web browser application, operable to allow users 130A-D (referred to collectively as users or individually as a user 130A and co-authors 130B-D) to access documents 105 as well as to share files and collaborate with other users online. The one or more client devices 125 may be one of a variety of suitable computing devices described below with reference to FIGS. 11 through 13. For example, the one or more client devices 125 may include a tablet computing device, a desktop computer, a mobile communication device, a laptop computer, a laptop/tablet hybrid computing device, or other types of computing devices for executing applications, including thin client applications 135, for performing a variety of tasks.

The server 110 may be any of a number of types of computing devices operable to execute one or more software programs typically in a networked environment; however, a server may also be implemented as a virtual server (software programs) executed on one or more computing devices viewed as a server on the network. One or more rich web applications 115 may be run on one or multiple servers 110 and may manage requests from a web front-end component, cache renditions, store, calculate, and render documents 105 for consumption by thin client applications 135, for example, a web browser. Documents 105 may be stored on the server 110, and may be accessed by various users 130 in various locations, for example, via a thin client application 135 connected to a network 120. The one or more web applications 115 may use standard transports, encodings, and protocols to exchange information on various platforms via various networks 120, and may utilize a set of standards that describe the syntax and semantics of software communication. The web applications 115 give users 130 a browser-based viewing and editing experience by providing a representation of a document 105 using native browser objects such as hypertext markup language (HTML), JavaScript®, and images.

In general the present disclosure is related to situations in which a spreadsheet application, or a web-browser spreadsheet application version, provides presence information of multiple users working collaboratively on a workbook. In some embodiments, the present disclosure contemplates a circumstance in which users of two or more different client devices 125 intend to access a particular workbook or spreadsheet document 105 stored on the server 110 concurrently. In the embodiment shown, client devices 125A, 125B, 125C, and 125D have accessed a document 105, and are concurrently viewing and/or editing the document. As users 130 select elements in the document 105, add data to the document 105, or edit data in the document 105, the client applications 135 may communicate such information to the server 110. An edit may include typing, clearing content in a cell or range of cells, paste commands that may change values in a cell, etc. The server may receive and synchronize the information, including presence information, and may notify the coauthoring users 130 via the thin applications 135 of edits made by other users, as well as provide presence information associated with each of the other coauthoring users 130.

As mentioned above, the client application 135 may send collaborative presence information to the server 110. Collaborative presence information may include information associated with where users are working in a document 105 (e.g., a cell, a range of cells, etc.), information associated with who the other users are (e.g., name, picture, status, title, etc.), and information associated with what the users are doing (e.g., editing, selecting, active, inactive, etc.), According to an embodiment, each user 130 accessing a particular document 105 may have various pieces of metadata (e.g., a name, a picture, a color, status, a current input mode, etc.) associated with him. For example, if a user 130 has not entered or chosen a name, a name, such as "Guest 1" may be assigned to him.

As mentioned above, various pieces of metadata may be associated with the user, such as, a color. Consider, for example, co-author B 130B may be assigned blue, co-author C 130C may be assigned red, co-author D 130D may be assigned purple. When a user 130 selects an element in a document 105, for example, a cell or a range of cells, the selection may be displayed to the other users as outlined in the user's assigned color (herein referred to as a presence border). Other pieces of metadata (e.g., a name, a picture, status, a current input mode, etc.) may also be displayed at or near the user's 130 selection.

Figure 2:
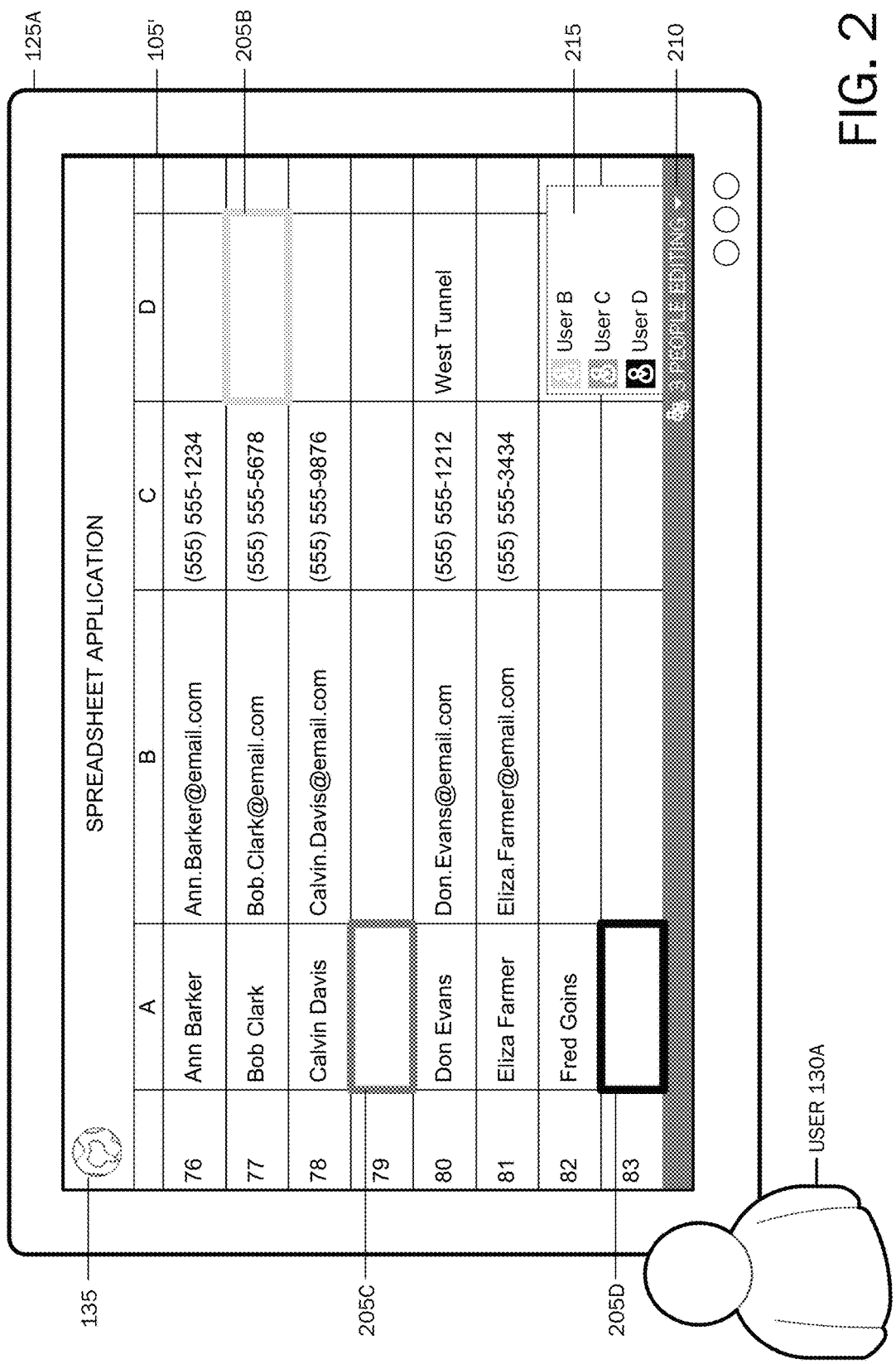
FIG. 2 is an illustration of an example document shown displayed on a client device including indications of other users' presence in the document.

Referring now to FIG. 2, an example document 105 is shown displayed on a client device 125A. According to embodiments, when a user 130 makes a selection, his selection may be shown in all other users' displays. The selection may include a single cell selection or a range selection. Consider, for example, the document 105 is being edited concurrently by User A 130A and co-authors B, C, and D (130B-D). The illustration in FIG. 2 is shown at the perspective of User A 130A. Consider also that co-author B 130B has selected cell D77, co-author C 130C has selected cell A79, and co-author D 130D has selected cell A83. Accordingly, as displayed on User A's 130A client device 125A display, co-author B's selection (cell D77) may include a blue presence border 205B, co-author C's selection (cell A79) may include a red presence border 205C, and co-author D's selection (cell A83) may include a purple presence border 205D. A user interface (UI) presence notification pane 210 may be provided within the application (UI), which may include such information as a number of coauthors (i.e., other users 130 concurrently editing/viewing the document 105). The presence notification pane 210 may be expanded to display metadata associated with each coauthor (e.g., a listing of each coauthor's name, assigned color, picture, status, etc.).

According to embodiments, when a user 130 enters edit mode on an element, such as a cell or a range of cells (herein referred to as a selection), the client application 135 may communicate to the server 110 that the selection is being edited by the user. Edit mode may include a state when values are being typed into a cell, when a cell is selected and typing in a formula bar is detected, or when a functionality for entering edit mode is selected.

The server 110 may push information to each client application 135 in the collaboration session that a user 130 has entered edit mode for a particular selection. Accordingly, the client application 135 running on each of the other users' client devices 125 may display an indication that the selection is being edited by the specified user 130. According to embodiments and as illustrated in FIG. 3, the displayed indication may be a fill color treatment 310, the fill color treatment 310 being displayed in a same color as the color assigned to the specified user 130.

Figure 3:
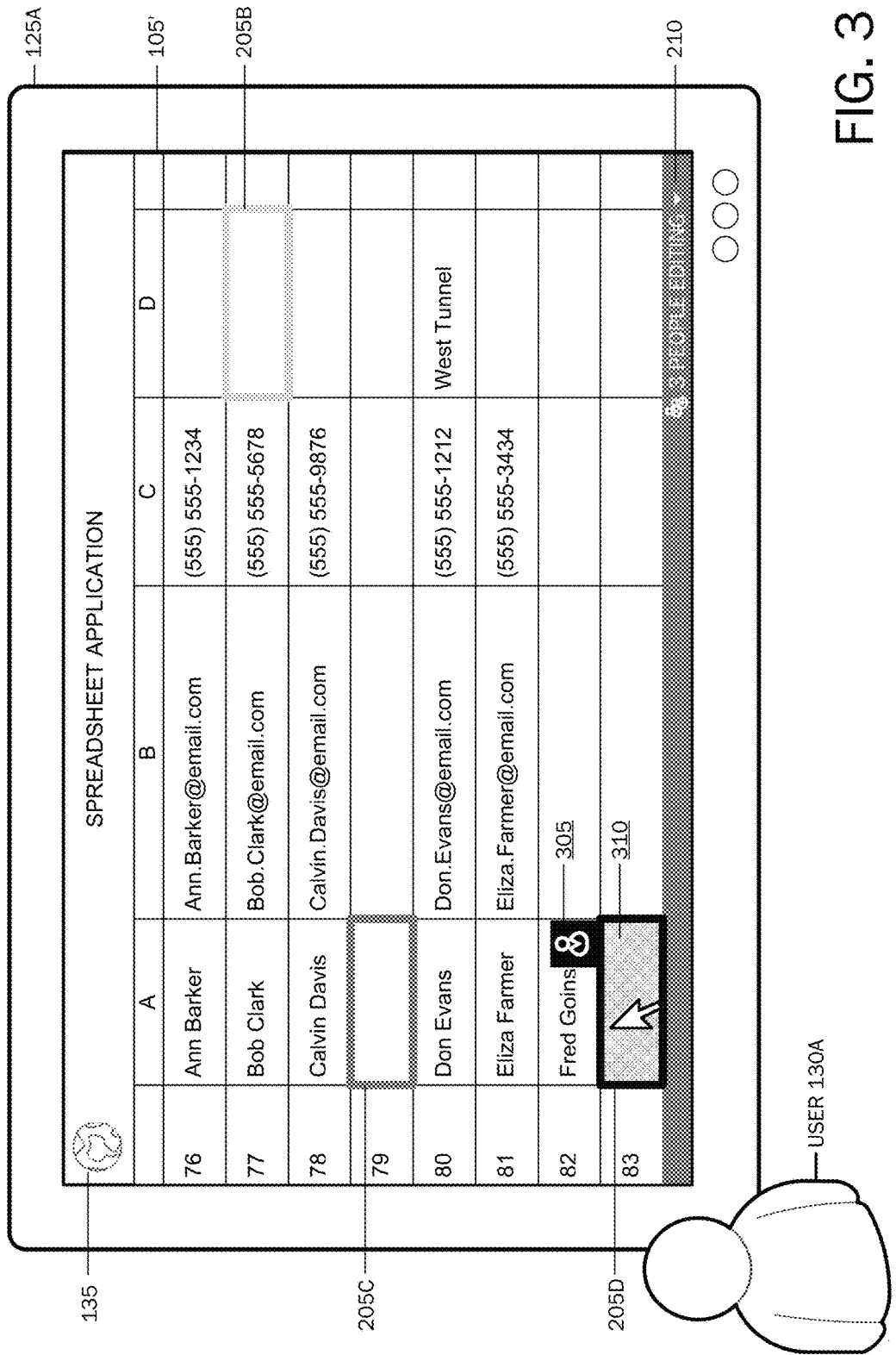
FIG. 3 is an illustration of the example document of FIG. 2 including a display of a user interface (UI) element after a trigger is received.

For example and referring still to FIG. 3, if co-author D 130D enters edit mode on cell A83, the other users/co-authors (User A 130A, co-author B 130B, and co-author C 130C) may see an indication that co-author D 130D is editing. As one example of a UI treatment that may be applied, the background color of the selection by co-author D 130D may be displayed in the color assigned to the co-author 130D editing the selection (i.e., fill color treatment 310). As another example, a change may be applied to the co-author's picture (e.g., the user's face may change to an editing pencil). Other UI treatments (e.g., text overlay, an animation such as a flashing cell border, etc.) may be applied. According to one embodiment, the fill color treatment 310 may be a predetermined percentage transparency of the color assigned to the user 130D. Accordingly, the contents of the selection may be seen through the transparency.

As described, a presence border 205 may be indicative of a selection of a cell or range of cells by a user 130, and a fill color treatment 310 may be indicative of one or more users editing a cell or range of cells. Upon receiving an indication of a trigger associated with a selection with a presence border 205 and/or a fill color treatment 310, a client application 135 may display a selectable UI element 305, for example, an avatar. A trigger may include a selection of the cell or range of cells or hovering over the cell or range of cells. For example and as illustrated in FIG. 3, a user 130 may hover over cell A83, and accordingly, the selectable UI element 305 may be displayed. The selectable UI element 305 may indicate that one user (co-author D 130D) is editing the selection, for example, by providing an icon displaying one user and including the color assigned to the co-author 130D.

Figure 4:
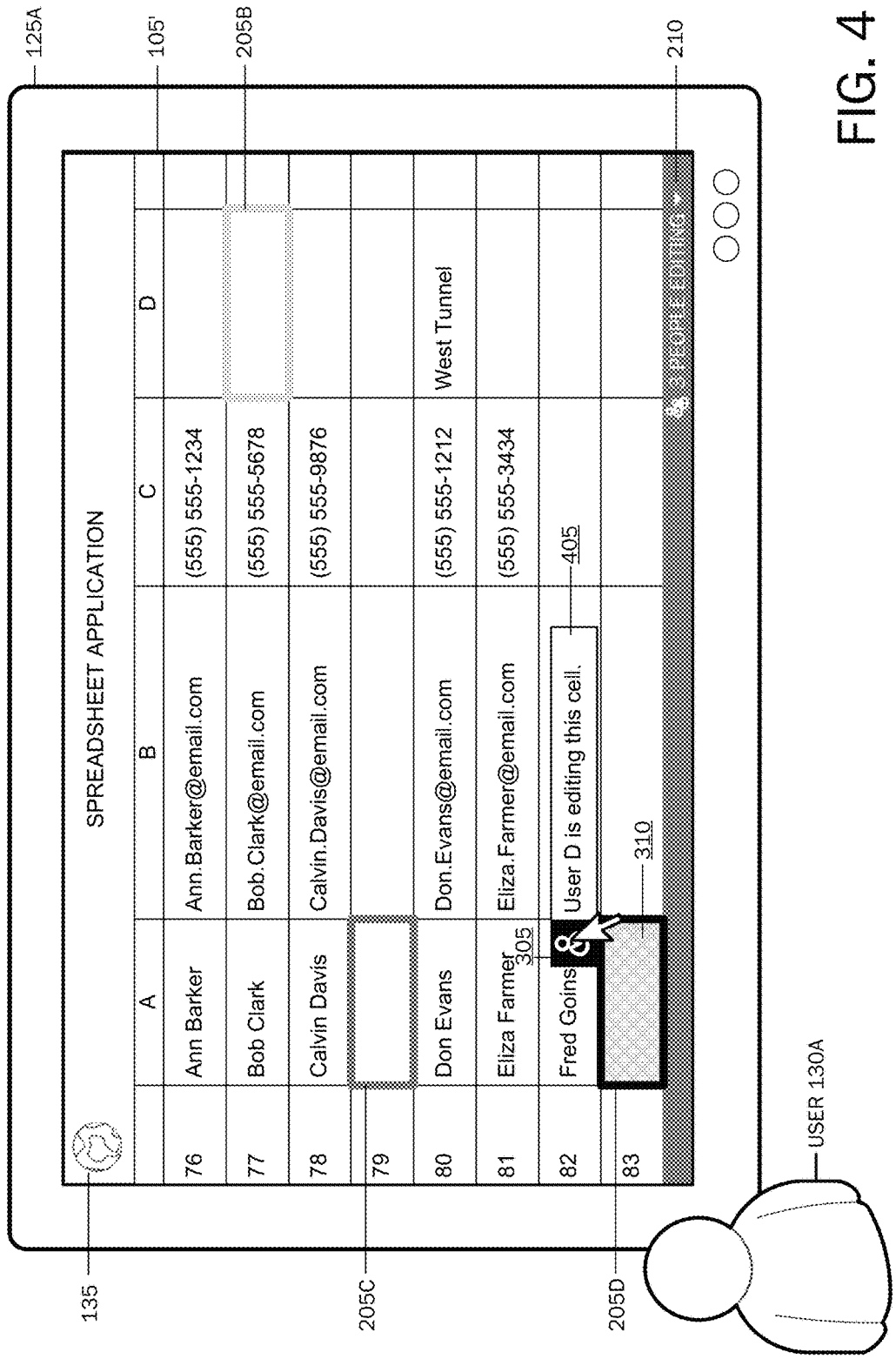
FIG. 4 is an illustration of the example document of FIG. 3, wherein the UI element has been selected, and a list including user information is displayed.

According to embodiments, selection of the displayed selectable UI element 305 may provide a display of the identity of the user 130D editing the selection. For example and as illustrated in FIG. 4 as displayed on User A's client device 125A, User A 130A may select the displayed selectable UI element 305, and accordingly, a list 405 including the user 130 editing the selection (co-author D 130D) may be displayed.

Oftentimes, more than one user 130 may select (or edit) a same cell or range of cells. According to an embodiment, when a cell or range of cells is selected by more than one user 130, the presence border 205 displayed on the selection may be displayed as the color of the last user 130 to select the cell or range of cells. Likewise, if the cell or range of cells is being edited by more than one user 130, the fill color treatment 310 may be displayed as the color of the last user 130 to select the cell or range of cells for editing. According to other embodiments, the presence border 205 may be displayed as the color of the first user 130, or as a multi-user color, such as gray.

Figure 5:
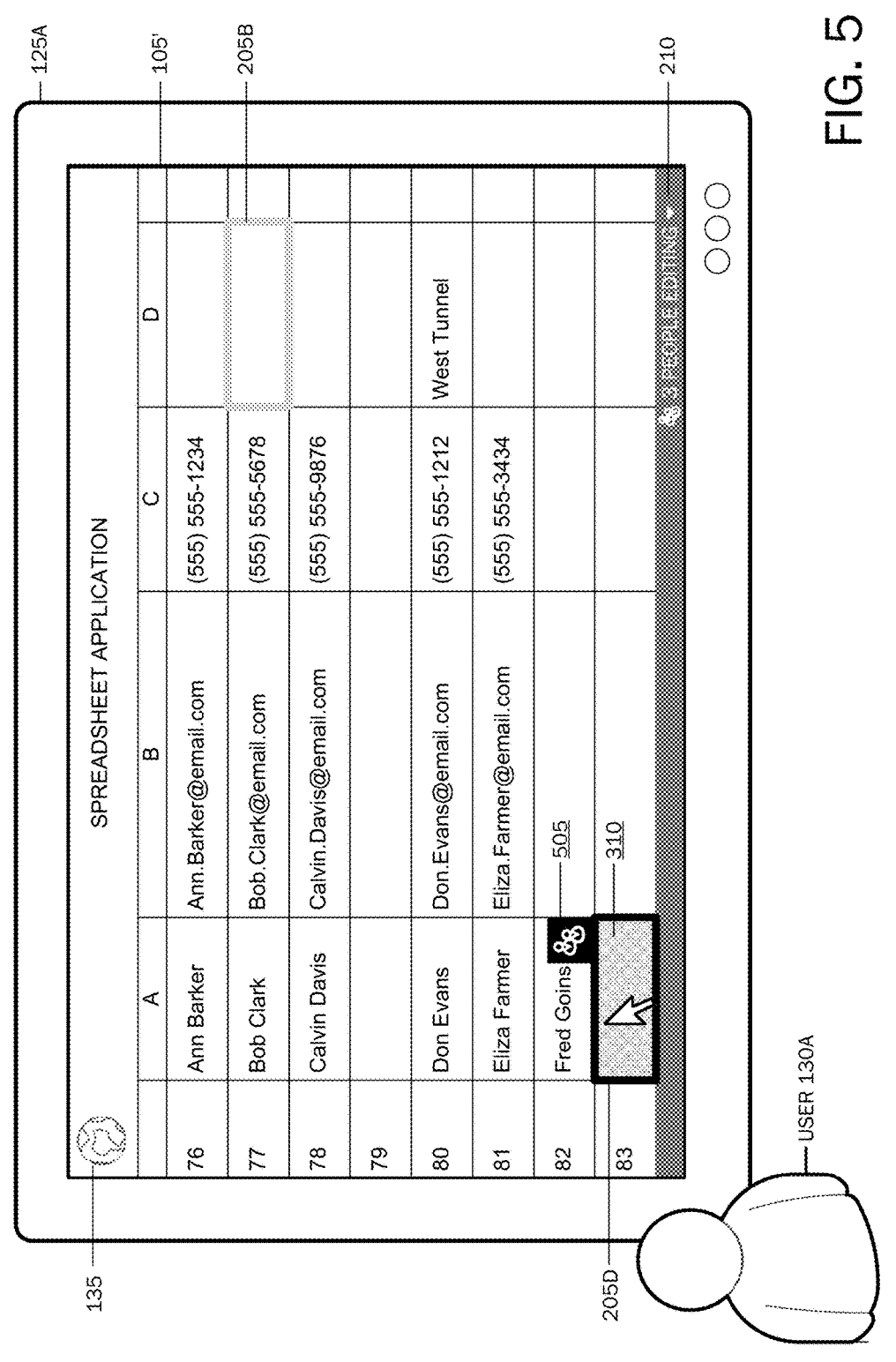
Figure 6:
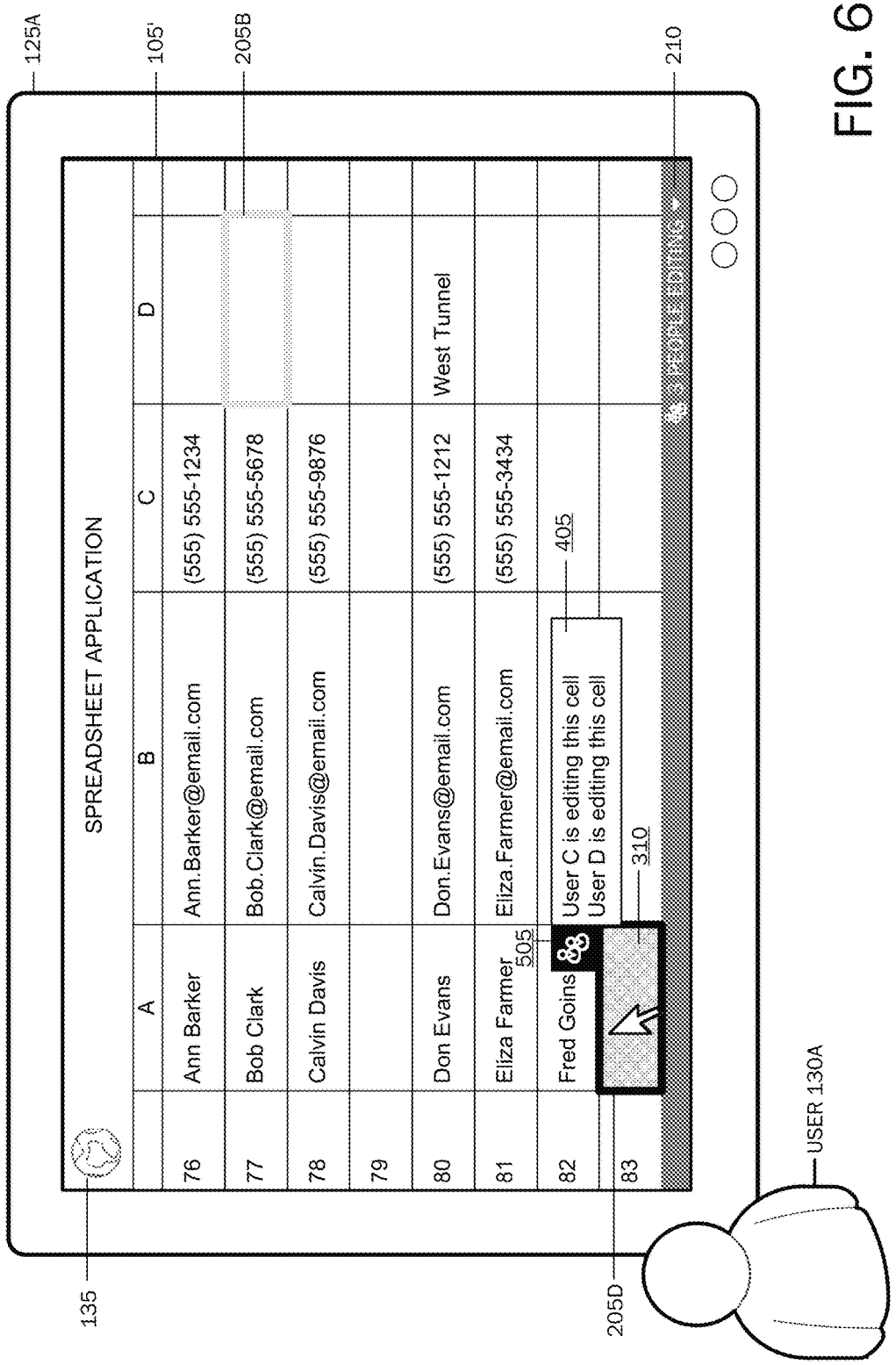
FIG. 6 is an illustration of the example document of FIG. 5, wherein the multi-user UI element has been selected, and a list including user information is displayed.

When a trigger (i.e., hover or selection) is detected in association with a cell or range of cells that is selected by or being edited by more than one user 130, a multi-user UI element 505 may be displayed as illustrated in FIG. 5. The multi-user UI element 505 may be indicative of multiple users 130 selecting/editing a same cell or range of cells. Like the single user UI element 305, the multi-user UI element 505 may be selectable. When selected, a list 405 including the users 130 editing the selection may be displayed. For example and as illustrated in FIG. 6, when User A 130A selects the multi-user UI element 505 on cell A83, a list 405 is displayed showing that co-author C 130C and co-author D 130D are concurrently editing the selection.

As described above, a range of cells may be selected by a user 130. FIG. 7 shows an example of a multi-cell range selection 710 (A77:C80). As illustrated, a presence border 205 may be displayed around the multi-cell range selection 705. Additionally, a current cell being edited within the multi-cell range selection 705 may comprise a fill color treatment 310. Alternatively the entire selection may comprise a fill color treatment to indicate a cell within the multi-cell range is being edited.

FIG. 8 shows two overlapping multi-cell range selections 710. According to an embodiment, if a selected cell or multi-cell range selection 710 overlaps with another user's selection, a selectable UI element 305,505 may be displayed at the intersection of the selections, as illustrated in FIG. 8. When a user's selection 710 overlaps with another user's or multiple users' multi-cell range selection 710, a list 405 of the users whose selections overlap may be displayed when a trigger is detected. According to an embodiment if a trigger is detected and a list 405 is not already displayed, a list 405 including all users 130 whose selections 710 overlap with the selection associated with the trigger may be provided. If a selection 710 is made that overlaps with another selection 710 is detected and a list 405 is already displayed, the user 130 associated with the additional selection may be dynamically added to the already displayed list 405.

Figure 9A:
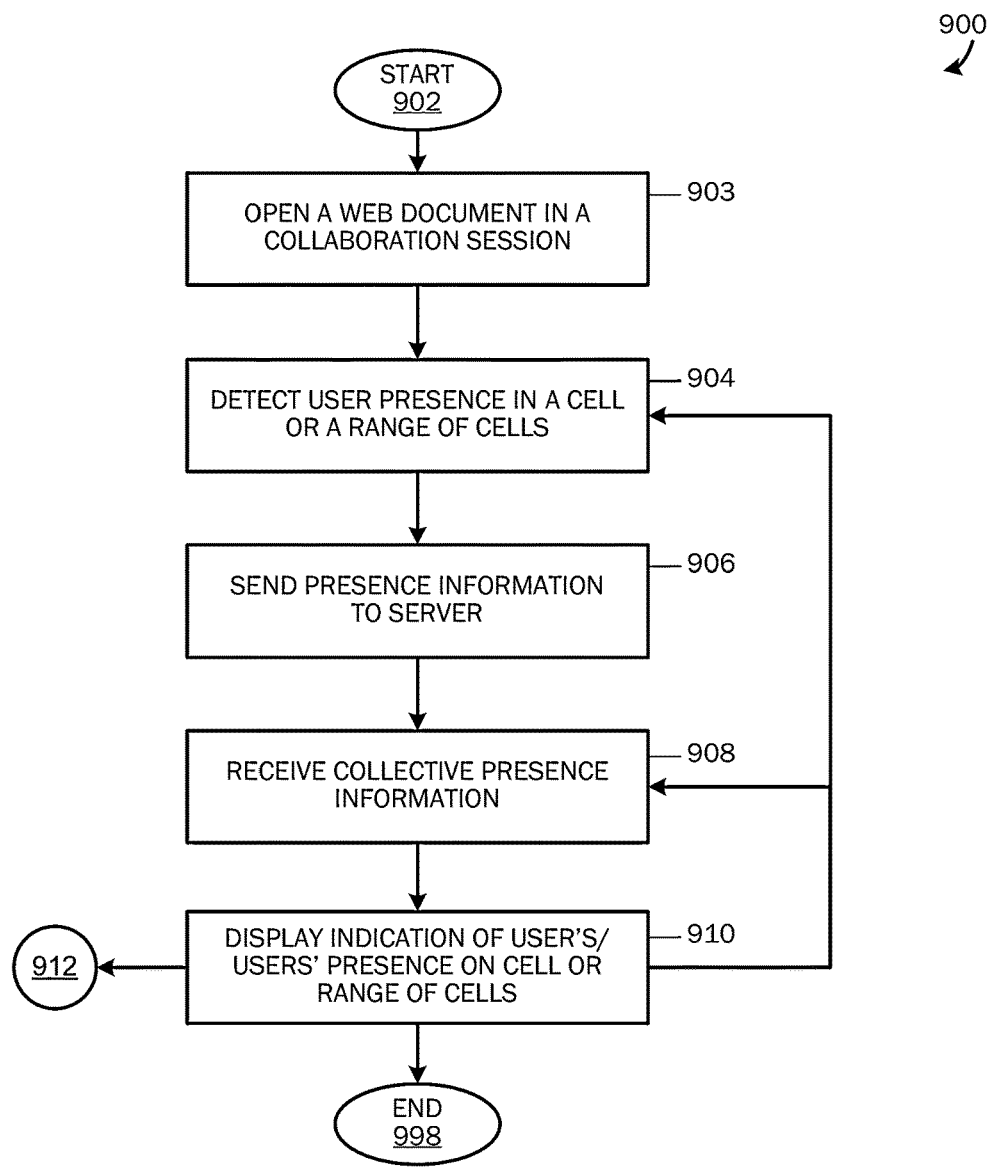
FIGS. 9A and 9B are flow charts of a method for providing dynamic collaborative presence information via a client application.

FIG. 9A is a flow chart showing one embodiment of a method 900 for providing dynamic collaborative presence information via a client application 135. The method 900 starts at OPERATION 902 and proceeds to OPERATION 903 where a user opens a document 105 (e.g., spreadsheet, workbook, etc.) concurrently being viewed and/or edited by one or more other users 130 (i.e., a collaboration session). As described above, the document 105 may be stored on a server 110 and opened via a thin client application 135, such as a web browser application, running on each user's client device 125.

The method 900 may proceed to OPERATION 904, where the client application 135 may detect a user's 130 presence in a cell or a range of cells in a document 105. A user's presence in a cell or a range of cells may include cell selection or cell editing. Cell editing may include both in-cell editing and formula bar editing.

Detected presence information may be sent to the server 110 at OPERATION 906. The method may then proceed to OPERATION 908, where collective presence information may be received from the server 110 (server processing will be described with respect to FIG. 10). Collective presence information may include presence information associated with each of the other users 130 in the collaboration session.

The method 900 may then proceed to OPERATION 910, where, depending on the cells each user 130 has selected or is editing, the client application 135 displays an indication of the presence of each of the other users 130 in the collaboration session in the document 105. For example and as described above, if one or more users 130 have selected a cell or a range of cells, a presence border 205 may be displayed around the selected cell(s) in a color specific to the user 130 who selected the cell(s). As described above, if more than one user has selected a cell or range of cells, the color of the presence border 205 may be the color assigned to the last user to select the cell or range of cells. If a cell or a range of cells is being edited by one or more users 130, the cell or range of cells being edited may include a fill color treatment 310 in a color specific to the user 130 editing the selection. As described above, if more than one user is editing a selection, the color of the fill color treatment 310 may be the color assigned to the last user to enter edit mode for the selection. According to an embodiment, if a user 130 is editing a cell via a formula bar, and if another user 130 selects the same cell, a presence border 205 may be displayed around the formula bar in the color assigned to the other user. If the other user 130 enters edit mode on the same cell, a fill color treatment 310 may be displayed in the formula bar in the color assigned to the other user, or a same UI treatment as the cell may be applied to the formula bar.

Figure 9B:
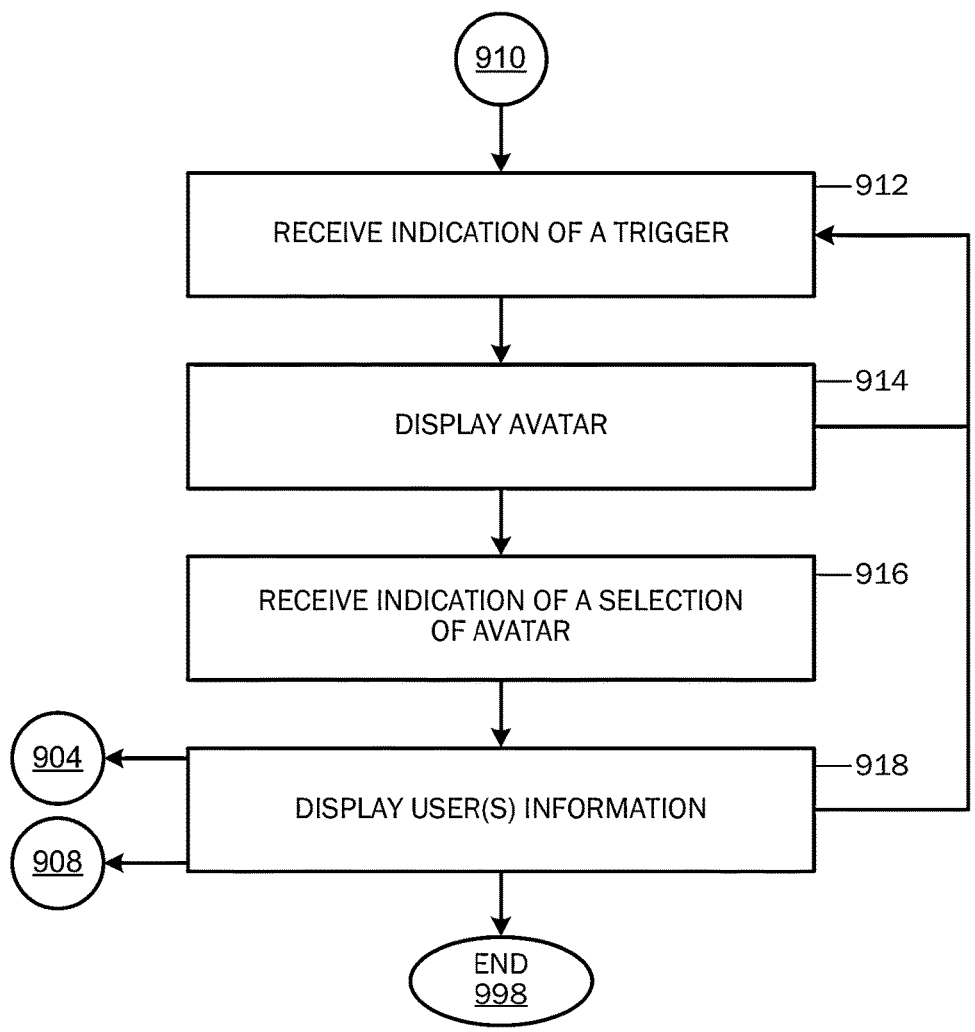

The method 900 may return to OPERATION 904, where the user's presence is detected, and/or may return to OPERATION 908, where additional collective presence information may be received from the server 110. The method 900 may end at OPERATION 998, or may continue to OPERATION 912 in FIG. 9B. At OPERATION 912, the client application 135 may receive an indication of a trigger.

As described above, a trigger may include a selection or hovering of a cell or a range of cells that has presence information associated with it.

Upon receiving an indication of a trigger, the method 900 may proceed to OPERATION 914, where a UI element 305,505 may be displayed with the selected cell or range of cells. If the cell or range of cells is concurrently selected by one other user 130, the displayed UI element may be a single user UI element 305. If the cell or range of cells is concurrently selected by more than one other user 130, the displayed UI element may be a multi-user UI element 505. According to embodiments, the UI element 305,505 may be selectable.

The method 900 may return to OPERATION 912, where a trigger may be received in associated with another cell or range of cells, or may proceed to OPERATION 916, where an indication of a selection of the displayed UI element 305,505 may be received. The method 900 may then proceed to OPERATION 918, where a list 405 of the user 130 or users 130 who have selected or are editing the cell or range of cells may be displayed. The list 405 may also include the color assigned to each of the users 130 in the list. The method 900 may return to OPERATION 912, where a trigger may be received in associated with another cell or range of cells, or may return to OPERATION 904, where the user's presence is detected in a cell or a range of cells, may return to OPERATION 908, where additional collective presence information may be received from the server 110, or may end at OPERATION 998. As should be understood, displaying presence borders 205, fill color treatments 310, UI elements 305,505, and lists 405 of user information is a dynamic process, wherein if presence information provided from the server 110 changes from what is currently displayed, the display may be updated to reflect the most recently received presence information.

Figure 10:
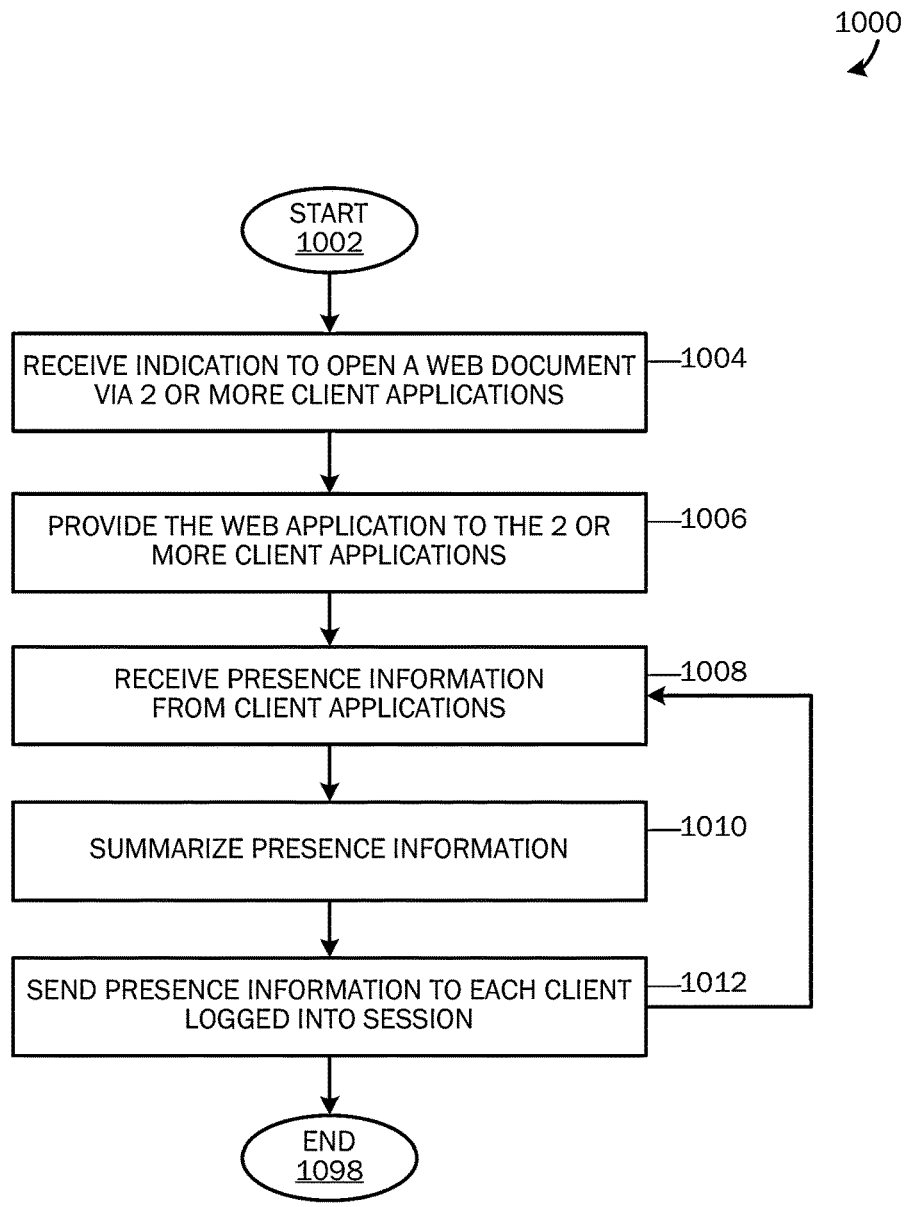
FIG. 10 is a flow chart of a method for providing dynamic collaborative presence information via a server.

FIG. 10 is a flow chart showing one embodiment of a method 1000 for providing dynamic collaborative presence information via a server 110. The method 1000 starts at OPERATION 1002 and proceeds to OPERATION 1004 where an indication of a request to open a web document 105 by two or more client applications 135 is received. At OPERATION 1006, the web document 105 may be provided to the two or more client applications 135 such that a collaboration session may be established.

The method 1000 may proceed to OPERATION 1008, where presence information from one or more client applications 135 may be received. The presence information may include a user's 130 presence in a cell or a range of cells in the document 105. A user's presence in a cell or a range of cells may include cell selection or cell editing. Cell editing may include both in-cell editing and formula bar editing.

At OPERATION 1010, the server 110 may summarize the received presence information, and at OPERATION 1012, the collective presence information may be sent to each of the client applications 135 in the collaborative session. For example, the server 110 may provide to each client application 135 information pertaining to which users 130 are collaboratively viewing or working on the document 105, as well as which cells or range of cells are currently selected or being edited by another user 130. The method 1000 may return to OPERATION 1008, where additional presence information from one or more client applications 135 may be received, or may end at OPERATION 1098.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 11:
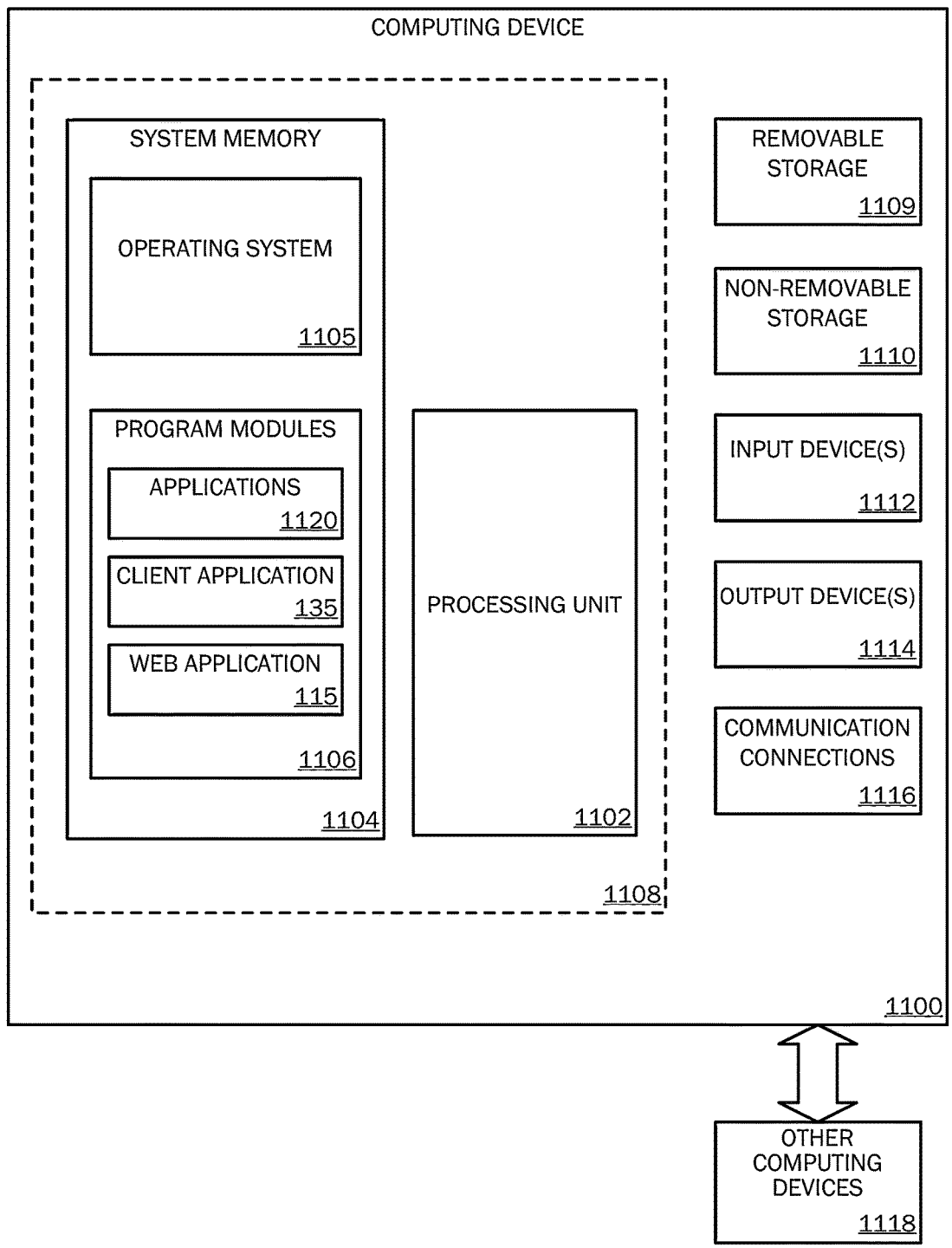
FIG. 11 is a block diagram illustrating example physical components of a computing device with which embodiments of the invention may be practiced.
Figure 12A:
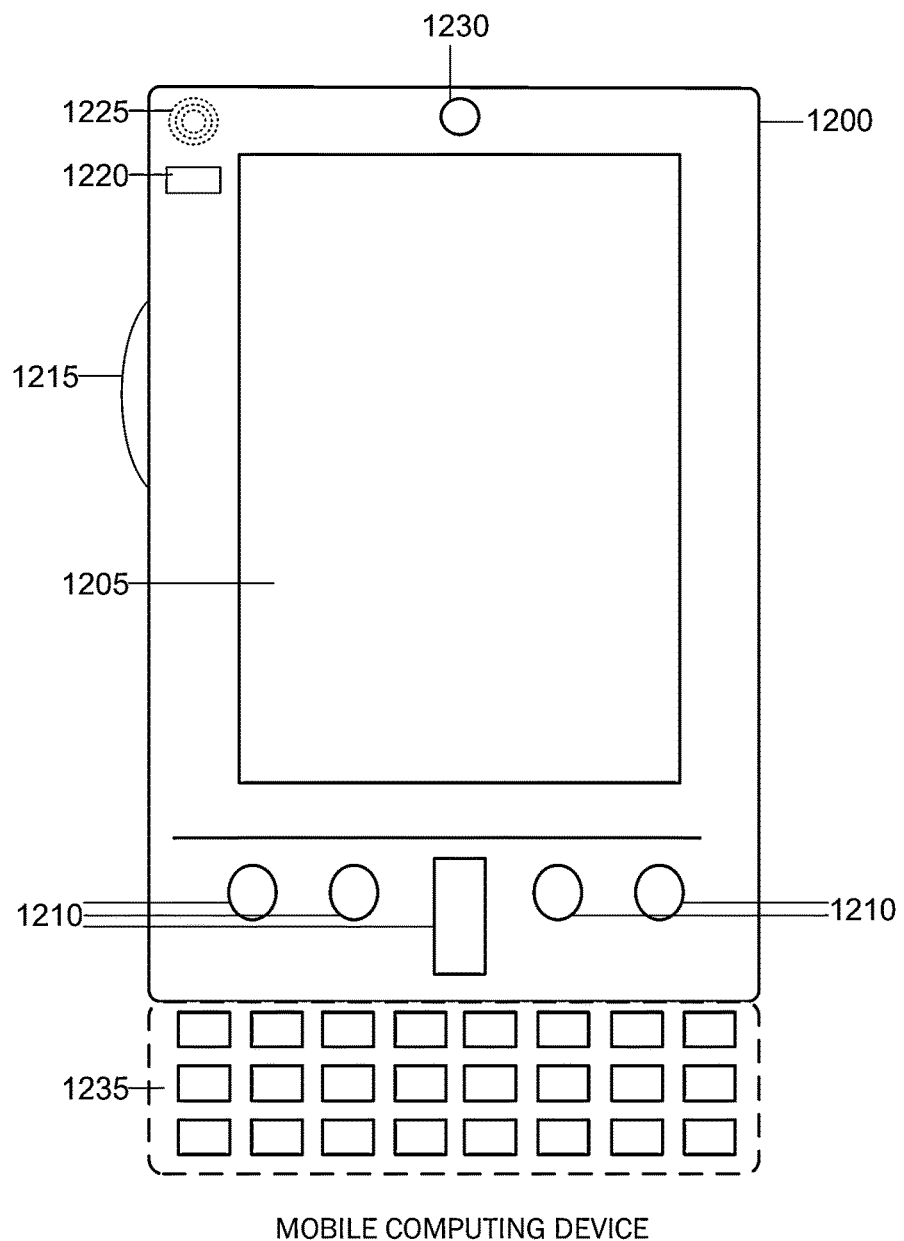
FIGS. 12A and 12B are simplified block diagrams of a mobile computing device with which embodiments of the present invention may be practiced.
Figure 12B:
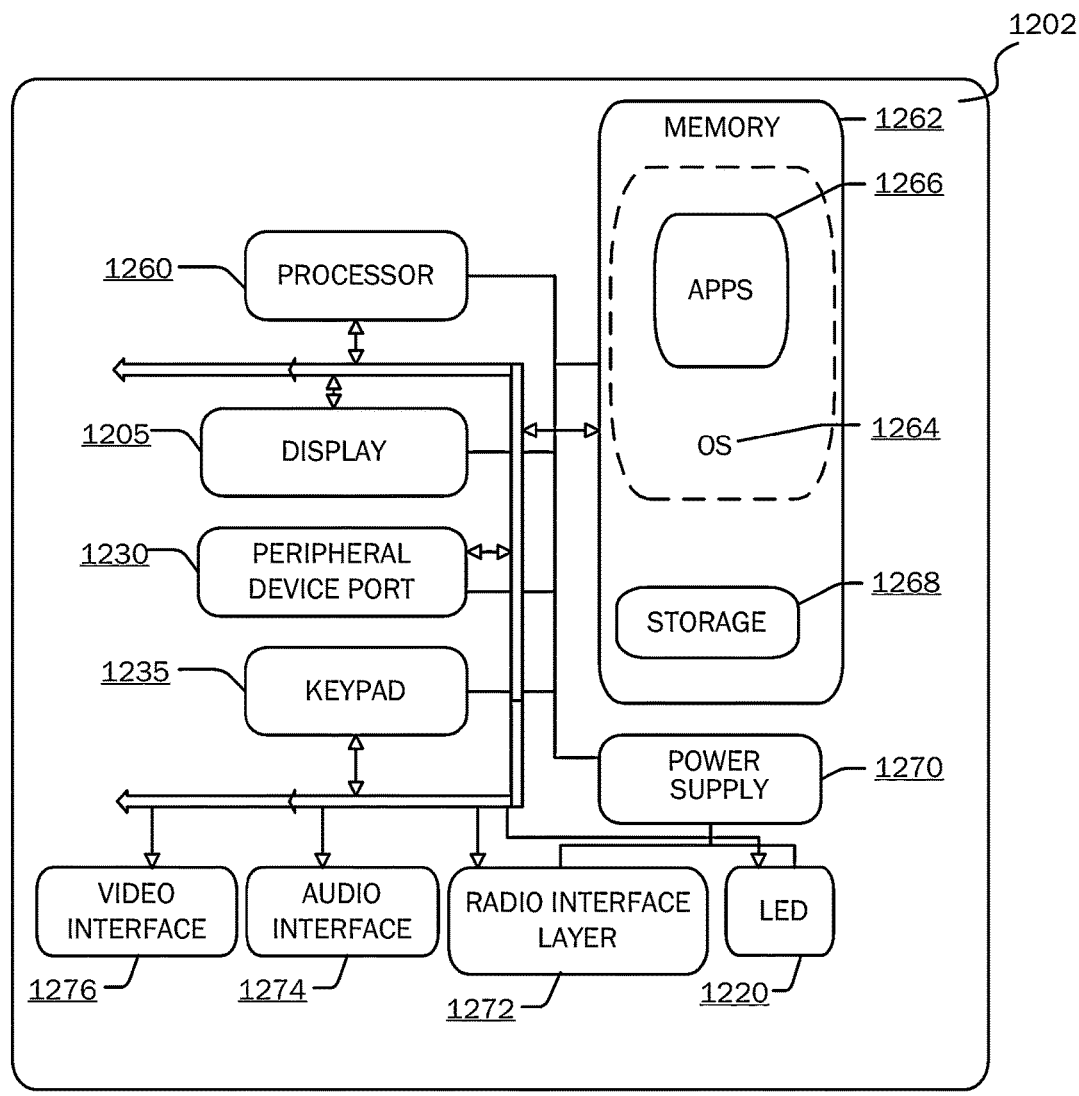
Figure 13:
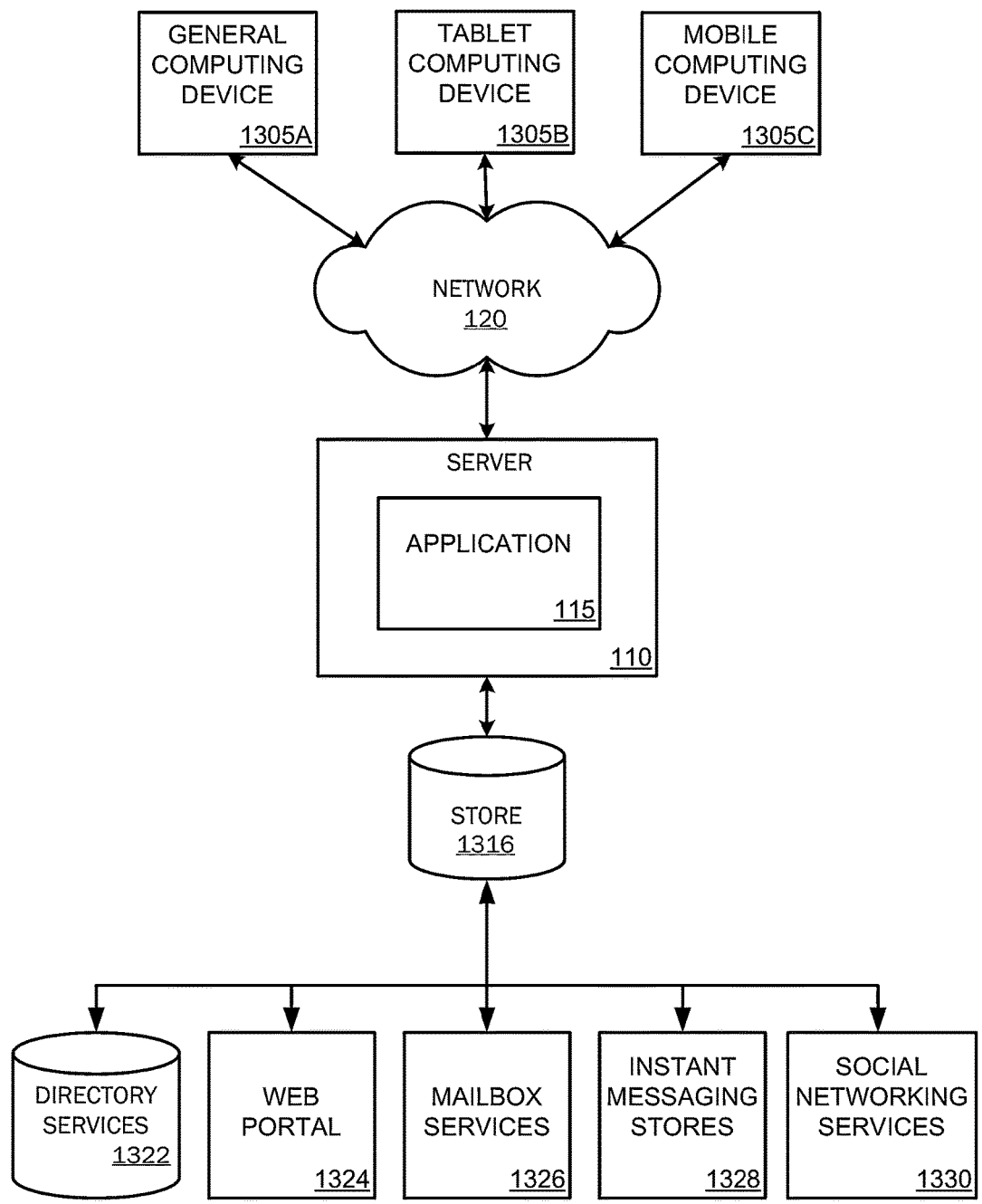
FIG. 13 is a simplified block diagram of a distributed computing system in which embodiments of the present invention may be practiced.

FIGS. 11-13 and the associated descriptions provide a discussion of a variety of operating environments in which embodiments of the invention may be practiced. However, the devices and systems illustrated and discussed with respect to FIGS. 11-13 are for purposes of example and illustration and are not limiting of a vast number of computing device configurations that may be utilized for practicing embodiments of the invention, described herein.

FIG. 11 is a block diagram illustrating physical components (i.e., hardware) of a computing device 1100 with which embodiments of the invention may be practiced. The computing device components described below may be suitable for the computing devices (e.g., client device 125 and server device 110) described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as a web application 115, a thin client application 135, etc. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality.

For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 may perform processes including, but not limited to, one or more of the stages of the methods 900 and 1000 illustrated in FIGS. 9A, 9B, and 10. Other program modules that may be used in accordance with embodiments of the present invention may include applications 1120, such as, electronic mail and contacts applications, word processing applications, spreadsheet applications, database applications, slide presentation applications, notes applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100.

FIGS. 12A and 12B illustrate a mobile computing device 1200, for example, a mobile telephone, a smart phone, a tablet personal computer, a laptop computer, and the like, with which embodiments of the invention may be practiced. With reference to FIG. 12A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one embodiment of a mobile computing device. That is, the mobile computing device 1200 can incorporate a system (i.e., an architecture) 1202 to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264, and may include a thin client application 135. Examples of the application programs include phone dialer programs, e-mail programs, personal information management (PIM) programs, notes applications, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 13 illustrates one embodiment of the architecture of a system for providing an improved dynamic user interface, as described above. Content developed, interacted with, or edited in association with an application 115 may be stored in different communication channels or other storage types. For example, various documents may be stored using a directory service 1322, a web portal 1324, a mailbox service 1326, an instant messaging store 1328, or a social networking site 1330. The application 115 may use any of these types of systems or the like for enabling data utilization, as described herein. The server 110 may provide the application 115 to clients. As one example, the server 110 may be a web server providing the application 115 over the web. The server 110 may provide the application 115 over the web to clients through a network 120. By way of example, the client computing device 125 may be implemented and embodied in a personal computer 1305A, a tablet computing device 1305B and/or a mobile computing device 1305C (e.g., a smart phone). Any of these embodiments of the client computing device 125 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for providing dynamic collaborative presence information, the method comprising:
    opening a document in a client application;
    detecting a selection or edit of a cell or a range of cells by a first user;
    sending information associated with the detected selection or edit to a server;
    displaying an indication of user presence of a second user in a cell or a range of cells in the document, including to display an indication of one or more of:

a current selection of a cell or a range of cells by the second user; or current editing of a cell or a range of cells by the second user, wherein the indication of the edit to a cell or range of cells comprises one or more of:

displaying a fill color treatment indicating that the cell or range of cells is currently being edited by the second user;

displaying text indicating that the cell or range of cells is currently being edited by the second user;

displaying an animation associated with the cell or range of cells currently being edited by the second user; or displaying an indication of user presence in a formula bar by the second user indicating the second user is currently editing the cell or range of cells;

receiving an indication of a trigger associated with the indication of user presence in a cell or a range of cells in the document; and displaying a UI element representative of the second user that is currently selecting or editing the cell or range of cells.

2. The method of claim 1, further comprising:

receiving an indication of a selection of the UI element; and providing a list of users concurrently viewing or editing the cell or range of cells associated with the selected UI element.

3. The method of claim 2, wherein providing a list of users concurrently viewing or editing the cell or range of cells associated with the selected UI element comprises:

using received collective presence information for determining a user or users viewing or editing the cell or range of cells; and displaying metadata associated with the user or users in the list.

4. The method of claim 1, wherein displaying an indication of a selection of a cell or a range of cells comprises displaying one or more of:

a presence border around the selected cell or range of cells, the presence border displayed in a color assigned to a user whose presence information is associated with the selected cell or a range of cells;

a name of a user whose presence information is associated with the selected cell or a range of cells;

an avatar of a user whose presence information is associated with the selected cell or a range of cells; or an indication of a status of user whose presence information is associated with the selected cell or a range of cells.

5. The method of claim 1, further comprising:

receiving collective presence information, the collective presence information comprising presence of a second user in a cell or a range of cells that is currently selected or being edited; and changing the display of the indication of user presence in the cell or the range of cells to an indication of user presence associated with the second user.

6. The method of claim 1, wherein receiving an indication of a trigger associated with the indication of user presence in a cell or a range of cells in the document comprises receiving an indication of a selection of or hovering over the cell or range of cells.

7. The method of claim 1, wherein displaying an indication of user presence in a cell or a range of cells in the document comprises displaying an indication of a selection of a cell or range of cells overlapping the selection or edit of the cell or a range of cells by the first user.

8. The method of claim 7, further comprising displaying a UI element anchored along an intersection of the first user's selection and the overlapping selection.

9. A system for providing dynamic collaborative presence information, the system comprising:

one or more processors; and a memory coupled to the one or more processors, the one or more processors operable to:

open a document in a client application;

detect a selection or edit of a cell or a range of cells by a first user;

send information associated with the detected selection or edit to a server;

display an indication of user presence of a second user in a cell or a range of cells in the document, wherein user presence in a cell or a range of cells comprises one or more of:

a current selection of a cell or a range of cells of the second user; or current editing of a cell or a range of cells by the second user, wherein the edit of the cell or the range of cells comprises providing the indication of user presence by a display of one or more of:

a fill color treatment indicating that the cell or range of cells is currently being edited by the second user;

text indicating that the cell or range of cells is currently being edited by the second user;

an animation associated with the cell or range of cells being currently edited by the second user; or an indication of user presence in a formula bar by the second user indicating the second user is currently editing the cell or range of cells;

receive an indication of a trigger associated with the indication of user presence in a cell or a range of cells in the document; and display a UI element representative of the second user that is currently selecting or editing the cell or range of cells.

10. The system of claim 9, wherein the processor is further operable to:

receive an indication of a selection of the UI element; and provide a list of users concurrently viewing or editing the cell or range of cells associated with the selected UI element.

11. The system of claim 10, wherein the processor, in providing a list of users concurrently viewing or editing the cell or range of cells associated with the selected UI element, is operative to:

use received collective presence information for determining a user or users viewing or editing the cell or range of cells; and display one or more pieces of metadata associated the user or users in the list.

12. The system of claim 9, wherein the processor, in displaying an indication of a selection of a cell or a range of cells, is operative to display a presence border around the selected cell or range of cells, the presence border displayed in a color assigned to a user whose presence information is associated with the selected cell or a range of cells.

13. The system of claim 9, wherein the processor is further operative to:

receive collective presence information, the collective presence information comprising presence of a second user in a cell or a range of cells that is currently selected or being edited; and change the display of the indication of user presence in the cell or the range of cells to an indication associated with the second user.

14. The system of claim 9, wherein the processor, in receiving an indication of a trigger associated with the indication of user presence in a cell or a range of cells in the document, is operative to receive an indication of a selection of or hovering over the cell or range of cells.

15. The system of claim 9, wherein the processor, in displaying an indication of user presence in a cell or a range of cells in the document, is operative to:
   display an indication of a selection of a cell or range of cells overlapping the selection or edit of the cell or a range of cells by the first user; and
   display a UI element anchored along an intersection of the first user's selection and the overlapping selection.

16. A method for providing dynamic collaborative presence information, the method comprising:
   opening a document in a client application;
   sending information associated with a user's presence within the document on the first client application;
   displaying an indication of user presence of a second user in the cell or the range of cells in the document, including displaying an indication of a current edit of the cell or the range of cells by the second user in the document, comprising displaying a fill color treatment indicating that the cell or the range of cells in the document is currently being edited by the second user;
   receiving an indication of a trigger associated with the indication of user presence in the cell or the range of cells in the document; and
   displaying a UI element representative of the second user that is currently selecting or editing the cell or the range of cells.

17. The method of claim 16, wherein receiving an indication of a trigger associated with the indication of user presence in a cell or a range of cells in the document comprises receiving an indication of hovering over the cell or range of cells.

18. The method of claim 16, wherein displaying the UI element comprises displaying a list of users concurrently currently selecting or editing the cell or the range of cells.

19. The method of claim 16, wherein displaying an indication of user presence in the cell or the range of cells in the document further comprises displaying an indication of a selection of a cell or a range of cells including displaying one or more of:
   a presence border around the selected cell or range of cells, the presence border displayed in a color assigned to a user whose presence information is associated with the selected cell or a range of cells;
   a name of a user whose presence information is associated with the selected cell or a range of cells;
   an avatar of a user whose presence information is associated with the selected cell or a range of cells; or
   an indication of a status of user whose presence information is associated with the selected cell or a range of cells.

20. The method of claim 16, further comprising:
   receiving collective presence information, the collective presence information comprising presence of a second user in a cell or a range of cells that is currently selected or being edited; and
   changing the display of the indication of user presence in the cell or the range of cells to an indication of user presence associated with the second user.

* * * * *